No. 669,211. Patented Mar. 5, 1901.
J. CARLSON & B. J. MALMFELT.
SPLIT GEAR WHEEL.
(Application filed Dec. 10, 1900.)
(No Model.)

Witnesses:
John Becker.
William Schulz.

Inventors:
John Carlson &
Bennet J. Malmfelt
per Roeder & Briesen
Attorneys

THE NORRIS PETERS CO., PHOTO-LITHO., WASHINGTON, D. C.

UNITED STATES PATENT OFFICE.

JOHN CARLSON AND BENNET J. MALMFELT, OF BROOKLYN, NEW YORK.

SPLIT GEAR-WHEEL.

SPECIFICATION forming part of Letters Patent No. 669,211, dated March 5, 1901.

Application filed December 10, 1900. Serial No. 39,256. (No model.)

*To all whom it may concern:*

Be it known that we, JOHN CARLSON and BENNET J. MALMFELT, citizens of the United States, and residents of Brooklyn, county of Kings, and State of New York, have invented certain new and useful Improvements in Split Gear-Wheels, of which the following is a specification.

This invention relates to a split gear-wheel having a removable rim and which is so constructed that the sections are reliably connected, that the rim is positively supported without being weakened, and that the parts may be readily assembled and separated.

Figure 1:
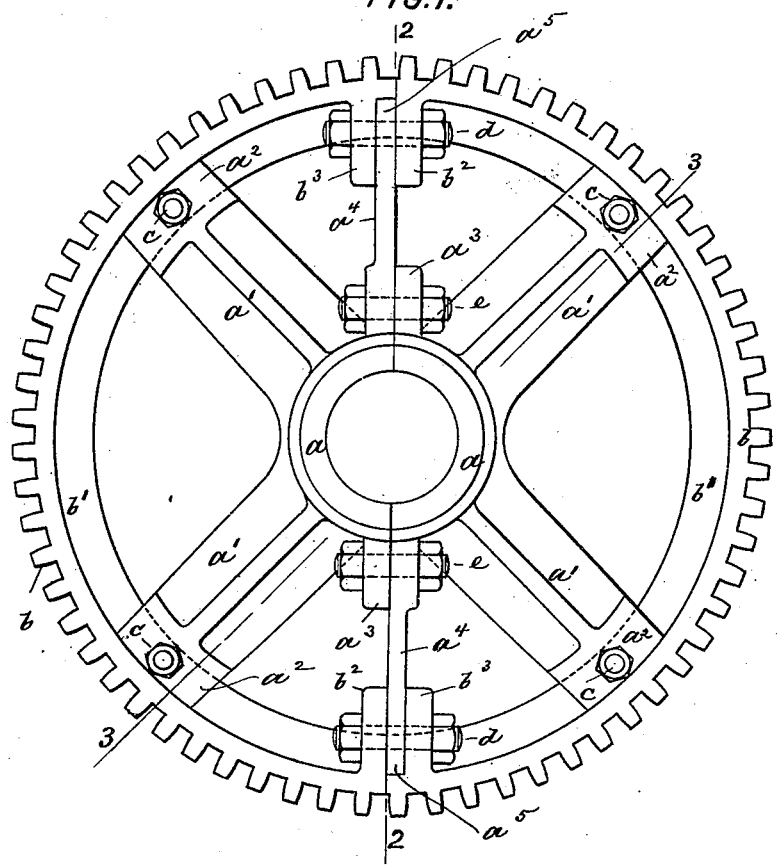
Figure 2:
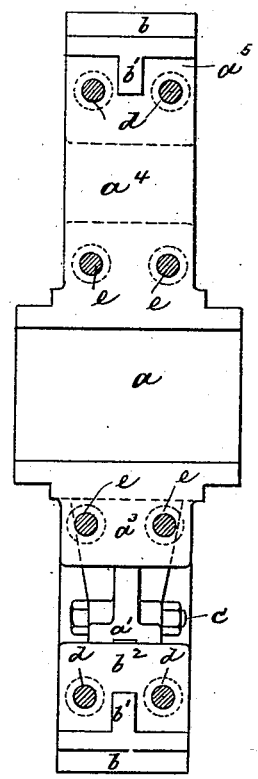
Figure 3:
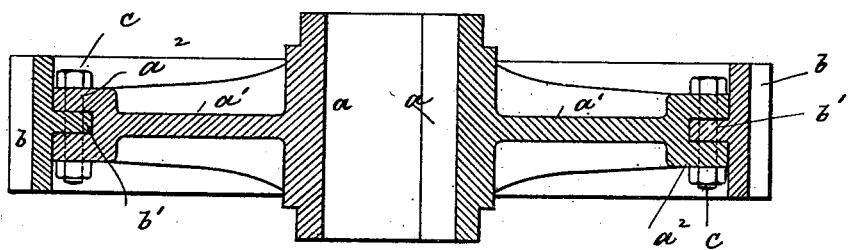

In the accompanying drawings, Figure 1 is a face view of our improved gear-wheel; Fig. 2, a section on line 2 2, Fig. 1; and Fig. 3, a section on line 3 3, Fig. 1.

The hub is composed of two equal sections adapted to be bolted to each other and also to the rim. Each hub-section $a$ is provided with preferably two spokes $a'$, having forked ends $a^2$, Fig. 3. At the edge of the hub is formed, furthermore, a perforated lug $a^3$ and diametrically opposite thereto an arm $a^4$, having notched end $a^5$ and lying in a plane at right angles to the spokes $a'$. Each toothed rim-section $b$ is provided with an inwardly-projecting web $b'$, a lug $b^2$ at one edge, and a lug $b^3$ set back from the other edge a distance equal to the width of the arm $a^4$.

To connect the parts, the forked ends $a^2$ of spokes $a'$ are caused to straddle the web $b'$ of rim $b$, to which they are connected by bolts $c$. The forked ends $a^5$ of arms $a^4$ straddle the web $b'$ between the lugs $b^2$ $b^3$ and are connected to the lugs by a pair of bolts $d$, one at each side of the wheel, Fig. 2. The inner ends of the arms $a^4$ are connected to the lugs $a^3$ by a pair of bolts $e$, also one at each side of the wheel.

It will be seen that in our improved gear-wheel all the parts may be readily assembled and that great strength, particularly at the connections, is obtained.

What we claim is—

1. A split gear-wheel composed of hub-sections having forked spokes, a diametrically-arranged lug and arm, combined with rim-sections having a web and lugs, and with bolts for connecting the arms at both ends to adjoining lugs, and the spokes at their outer ends to the web, substantially as specified.

2. A split gear-wheel composed of hub-sections having forked spokes, a lug and a forked arm lying in a plane at right angles to the spokes, combined with rim-sections having a web, a lug at one of the edges, and a lug set back from the other edge, and with bolts for connecting the spokes to the web and the arms to the lugs, substantially as specified.

Signed by us at Brooklyn, county of Kings, and State of New York, this 7th day of December, 1900.

JOHN CARLSON.
BENNET J. MALMFELT.

Witnesses:
JOHN B. WETHERBEE,
HUGH O. HARRIS.